Patented July 7, 1953

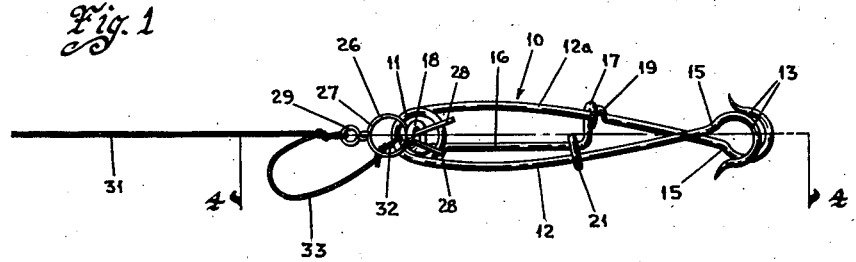
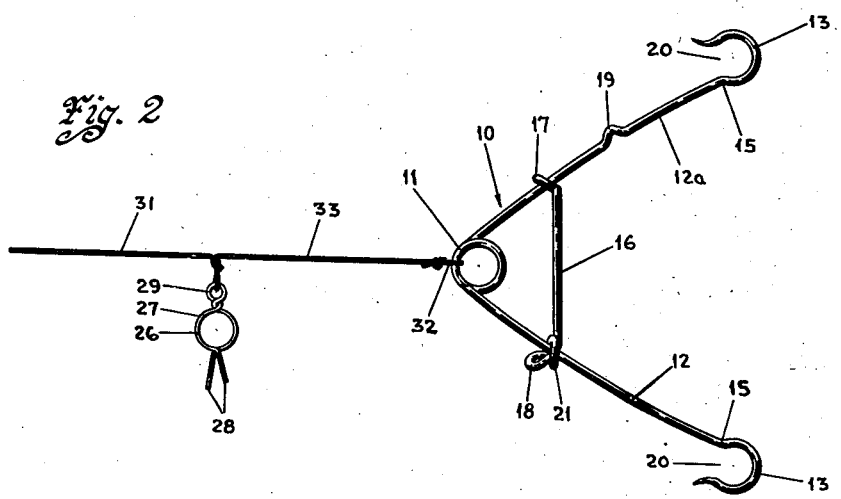
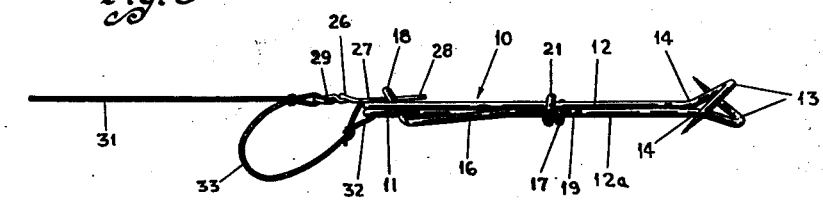
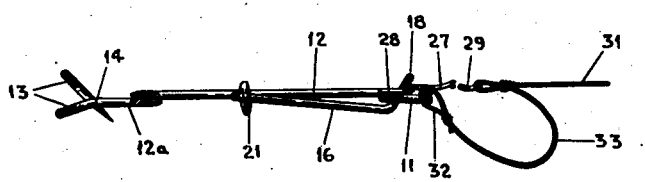

2,644,264

UNITED STATES PATENT OFFICE 2,644,264

FISHHOOK

William H. Heki, Lynnville, Iowa, assignor of one-half to Leonard Verwers, Pella, Iowa Application March 16, 1950, Serial No. 150,037

1 Claim. (Cl. 43—36)

This invention relates generally to fish hooks and in particular to a fish hook device wherein a hook is released or opened to a fish-catching position in response to a strike, or the application of a tension on the lead line connected with the device.

An object of this invention is to provide an improved fish hook device.

A further object of this invention is to provide a fish hook device in which hooks therefor, normally in a closed position, are sprung outwardly within the mouth of a fish in response to a tension applied on the line connected to the device by a fish striking the device.

Still another object of this invention is to provide a fish hook device in which a pair of barbless hooks are releasably locked together in an overlapping relation, and then released to spring outwardly from each other to catch within the mouth of a fish, so that the outward spring action in the hooks retains the hooks in the fish.

A feature of this invention is found in the provision of a fish hook device in which a resilient substantially V-shape body member has the legs thereof terminating in oppositely extending hooks. The legs are releasably locked together by means movably connected therebetween so that the hooks are in an overlapping or mutually closing relation. A release member for the leg locking means is attached to a lead line which is secured to the apex of the body member. On the application of a tension in the lead line, as occurs when a fish strikes the hooks, the release member is pulled out of engagement with the locking means, whereby the legs are permitted to swing outwardly from each other to catch within the mouth of the fish.

Further objects, features and advantages of this invention will become apparent from the following description, when taken in connection with the accompanying drawings, in which:

Fig. 1 is a plan view of the fish hook device of this invention in set position;

Fig. 2 is a plan view of the fish hook device in an open or sprung position;

Fig. 3 is a side elevational view of the device in its set position; and

Fig. 4 is a sectional view taken substantially along the line 4—4 in Fig. 1.

With reference to the drawings, the fish hook device of this invention, as illustrated in Fig. 2, includes a resilient wire body member 10 of a substantially V-shape having a coil spring portion 11 integrally formed at its apex or eye. The legs or shanks 12 and 12a, of the body member 10, terminate in bights or barbless hooks 13, which extend or open outwardly in opposite directions transversely of the body member terminating in sharp points. As best appears in Fig. 3, the legs 12 and 12a are bent, as indicated at 14, to provide for the hooks 13 being inclined laterally of the body member 10 in reverse directions. It is seen, therefore, that the bights 13 lie in obtuse planes relative to their respective shanks and at an acute angle to each other when the shanks are in the closed or overlapping position relative to each other. The bights in this closed or overlapping position define with the shanks a substantially ring-like opening having an axis substantially perpendicular to the plane of the eye, whereby a bait placed in the opening will be held with equal force by each shank and bight portion.

Movably connected between the legs 12 and 12a is an elongated wire member 16 having looped ends 17 and 18. Referring to Figs. 1 and 3, it is seen that the looped ends 17 and 18 of the elongated member 16 are offset laterally of the member 16 in directions spaced substantially ninety degrees apart. The ends 17 is mounted about the leg 12a between the apex 11 and a stop portion 19 formed by reversely bending the leg 12a at a position intermediate the ends thereof. A ring member 21 is loosely mounted about the leg 12 and the elongated member 16.

As shown in Fig. 2, the hook device is in its open or sprung position. In a set position of the hook device, which is illustrated in Fig. 1, the legs 12 and 12a are moved together so that their free ends are in a criss-cross relation and the hooks 13 in an overlapping and mutually covering or closing relation. Stated otherwise, what might be termed the shank portion 15 of one hook 13 extends across the opening 20 of the other hook 13. This inward position of the legs 12 and 12a is accomplished by moving the end 17 of the member 16 against the stop 19 and then inserting the end 18 through the coil spring 11. The member 16 is thus positioned between and extended longitudinally of the legs 12 and 12a and the ring member 21 is located against the looped end 17 of the member 16.

With reference to Fig. 1, it is seen that the action of the spring 11 to move the legs 12 and 12a outwardly from each other is applied against the end 17 and the ring 21 whereby to effect a movement of the end 18 out of the coil spring 11. It is seen, therefore, that the member 16, stop 19 and ring 21, in conjunction with the coil 11, function to releasably hold the legs 12 and 12a in their set positions. In this holding action the looped end 18 is in contact engagement with an inner side portion of the coil spring 11 so as to function as a stop or holding cam. To lock the holding means against releasing the legs 12 and 12a for outward springing movement there is provided a locking member or key 26 formed of a spring wire material and including a spring loop 27 terminating in diverging linear extensions 28, which are brought together for insertion within the looped end 18 on the member 16. The combined length of the member 26 is such as to extend across the coil spring 11 for bearing action with the coil to hold the end 18 against movement outwardly from the coil spring.

The loop 27 on the locking member or key 26 is integrally formed with an eye portion 29 for connection with a lead line 31 having one end 32 connected to the apex or coil portion of the member 10. As illustrated in Figs. 1, 3 and 4, the attachment of the lead line 31 with the key member 26 is at a position spaced from the end 32 of the lead line, so that when the key 26 is inserted through the looped end 18 that portion 33 of the lead line between its end 32 and the eye 29 is slack.

On the application of a tension in the lead line 31, and as will best appear from a consideration of Figs. 1 and 3, and which tension is effected when a fish strikes the hooks 13, the key member 26 is disengaged from the looped end 18, whereby the end 18 is moved outwardly from the coil spring 11, and the legs 12 and 12a are permitted to move to their outwardly sprung positions shown in Fig. 2, in which the member 16 is extended transversely of the body member 10 at a position adjacent to the eye or apex portion 11. Assuming the hooks 13 to be in the mouth of a fish at the time this releasing action takes place, it will be apparent that the spring action in the body member 10 firmly imbeds the hooks 13 within the fish.

In the playing of a fish that is hooked, when the lead line 31 is maintained taut, the legs 12 and 12a will tend to move inwardly toward each other. However, such tension in the lead line tends to more firmly imbed the hooks 13 within the fish. Should the lead line 31 become slack, as happens for example when a fish charges or moves toward a fisherman, the legs 12 and 12a are moved outwardly by the action of the coil spring 11 so as to retain the hooks 13 imbedded within the fish.

For different types of fishing, such as trolling, casting or still fishing, the tension required in the lead line 31 to release the key 26 from the looped end 18 of the member 16 can be varied by merely varying the angle of divergence between the extensions 28 on the key 26.

Thus for a greater angle of divergence between the extensions 28, a greater tension is required in the line 31 to release the key, and conversely when this angle of divergence is decreased, a lsser tension is required on the line 31.

By virtue of the overlapped relation of the hooks 13, when the device is in its set position shown in Fig. 1, the hooks or bights 13 may be readily baited with dough balls, worms, insects and minnows, it being readily apparent that a live bait would be secured to only one of the hooks 13.

In actual practice it has been found that the use of the hook device of this invention substantially eliminates any catching of small or undersized fish. Further, it has been found that the legs 12 and 12a tend to spring outwardly in a direction such as to become imbedded in the top and bottom of the mouth of a fish. One theory advanced for this occurrence is that a fish, in working on the bait, tends to roll the hook device to a position at which the points of the hooks 13 are in contact with its upper and lower jaws.

From a consideration of the above description, it is seen that the invention provides a hook device which eliminates the use of the usual barbs on a fish hook, is readily applicable to substantially any type of fishing and positive in its action for hooking in the mouth of a fish on the occurrence of a strike. Further, the device is readily removed from a fish by merely taking pliers or the like, forcing the legs 12 and 12a inwardly toward each other, moving the device in a direction inwardly of the fish until the hooks 13 are disengaged, and then withdrawing the device from the mouth of the fish. A tearing of the fish in the removal of the hooks is thus substantially eliminated.

Although the invention has been described with respect to a preferred embodiment thereof, it is to be understood that it is not to be so limited since changes can be made therein which are within the full intended scope of this invention, as defined by the appended claim.

I claim:

A fish hook formed of spring wire having a convolution intermediate the ends thereof defining an eye for the attachment of a leader, the portions on opposite sides of the eye constituting shanks having bights at the free ends thereof terminating in points, said shanks adapted to assume open and closed conditions, the bights of the shanks lying in planes at an obtuse angle to the respective shanks, the planes of each bight being at an acute angle to each other when the shanks are in a closed position in overlapping relation, locking means being provided for releasably holding said shanks in closed condition, each of the points of said bights under the latter condition extending upwardly at an acute angle to the plane of the eye and outwardly in opposite directions, the bights defining with the shanks a substantially ring-like opening having an axis normal to the plane of the eye, whereby a bait having its material extending through the ring-like opening will be held with substantially equal force by each shank and bight portion.

WILLIAM H. HEKI.

References Cited in the file of this patent

UNITED STATES PATENTS

| Number | Name | Date |
|---|---|---|
| 31,396 | Morris | Feb. 12, 1861 |
| 44,368 | Gardiner, Jr. | Sept. 20, 1864 |
| 324,294 | Brothwell | Aug. 11, 1885 |
| 377,294 | Dietz | Jan. 31, 1888 |
| 575,405 | Punches | Jan. 19, 1897 |
| 1,283,174 | Helgeson | Oct. 29, 1918 |
| 2,209,300 | Shipman | July 23, 1940 |
| 2,223,946 | Binkowski | Dec. 3, 1940 |